March 16, 1948.   P. H. HUTCHINSON   2,437,783
WORK GAUGING DEVICE FOR BORE GRINDING MACHINES
Filed March 17, 1945   2 Sheets-Sheet 1

INVENTOR
PHILIP H. HUTCHINSON
BY Romeyn A. Spare
HIS ATTORNEY.

March 16, 1948. P. H. HUTCHINSON 2,437,783
WORK GAUGING DEVICE FOR BORE GRINDING MACHINES
Filed March 17, 1945 2 Sheets-Sheet 2

INVENTOR
PHILIP H. HUTCHINSON
BY Romeyn A. Spare
HIS ATTORNEY.

Patented Mar. 16, 1948

2,437,783

UNITED STATES PATENT OFFICE 2,437,783

WORK GAUGING DEVICE FOR BORE GRINDING MACHINES

Philip H. Hutchinson, Montclair, N. J., assignor to General Motors Corporation, Detroit, Mich., a corporation of Delaware Application March 17, 1945, Serial No. 583,280

13 Claims. (Cl. 51—165)

This invention relates to gauging and comprises all of the features of novelty herein disclosed. It is common commercial practice to internally grind circular work pieces such as bearing race rings while the pieces are externally supported and rotated on a series of wheels or rollers, a plug gauge or a feeler gauge being used to control the internal diameter. Most bearing manufacturers hold a much closer size limit on the internal diameter than on the external diameter. For example, many such races have an allowable outside variation of approximately .0015 inch while the limits on internal diameter are sometimes as close as .0003 inch. Variations in external diameter will naturally cause the pieces to be displaced more or less from a normal position and so out of line with a plug gauge. A feeler gauge usually has a movement radially of the piece being ground and so the total feeler movement is small and lacks sensitivity. A sudden ample feeler movement at final size would be desirable but snap action gauges have not taken account of work displacement due to variation in external diameter.

An object of the invention, accordingly, is to provide an improved work gauging device and method to control grinding of the bore of sleeves, rings and the like. Another object is to provide a gauging device which will insure uniformity in the internal diameter of a series of externally supported work pieces even when the external diameters of the pieces vary. Another object is to provide a sizing gauge which will not only neutralize the effect of variations in external diameter but will have an ample snap action at final size, as to reliably complete an electric control circuit. Another object is to provide improved means for gauging work pieces which change position in accordance with size variation.

To these ends and also to improve generally upon devices of this character, the invention consists in the various matters hereinafter described and claimed. In its broader aspects, the invention is not necessarily limited to the specific constructions selected for illustrative purposes in the accompanying drawings in which Fig. 1 is a front view.

Figure 1:
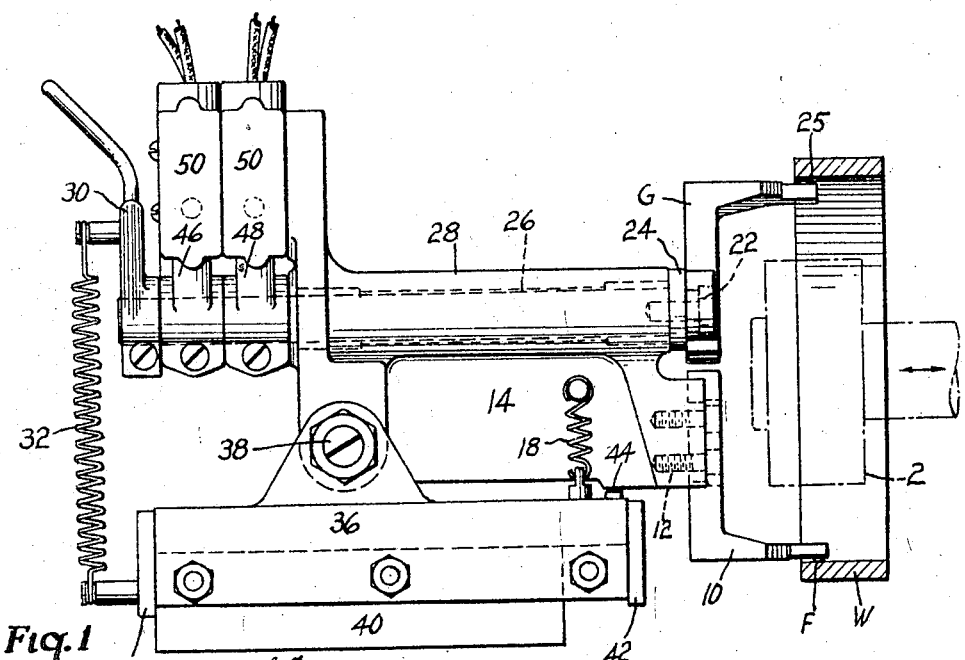

The work piece W is indicated as a cylindrical ring to be internally ground by a grinding wheel 2 which rotates and reciprocates axially, the work being supported and rotated by a driven backing roller 4 and a supporting idler roller 6. The work is also engaged by a spring pressed idler roller 8 which compensates for any variation in external diameter of the work pieces and holds them against the other rollers. A pair of gauge feelers engage the bore of the work piece during the grinding operation. One feeler comprises a bent supporting arm 10 the vertical leg of which is slotted and adjustably secured by screws 12 in a groove of a pivoted carrier or bracket 14. The other leg of the arm carries a rounded gauge point or supporting feeler F which rides on the bore of the work in or very close to a vertical diameter and floatingly supports the carrier or bracket 14 and all the parts carried thereby. A coil spring 18 urges the feeler against the work.

Figure 2:
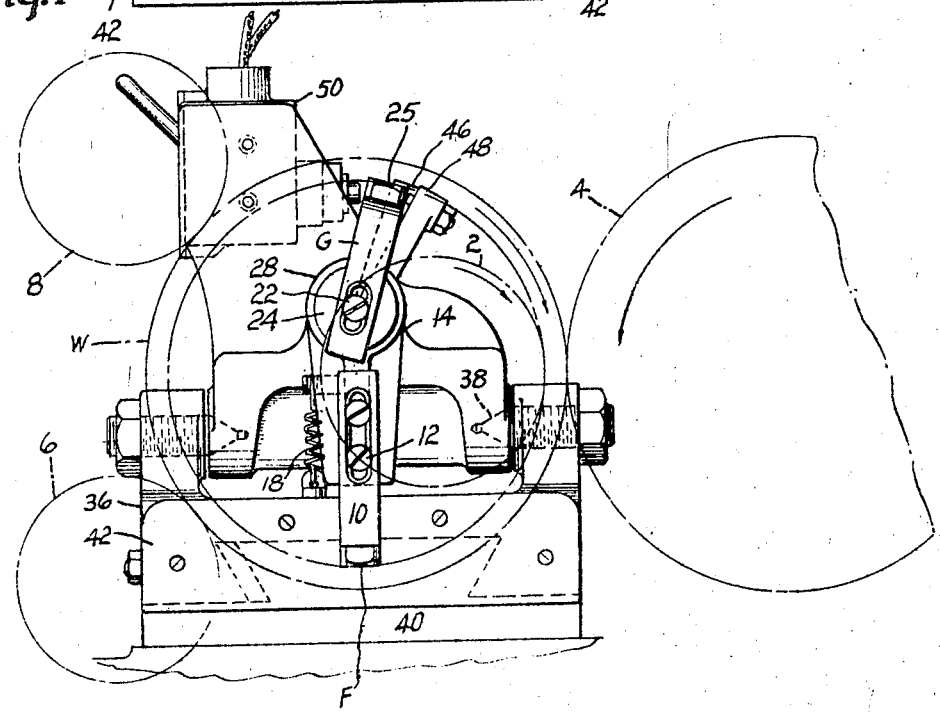
Fig. 2 is a right hand end view of Fig. 1, the work and its supporting rollers, and the grinding wheel being indicated in broken lines.
Figure 3:
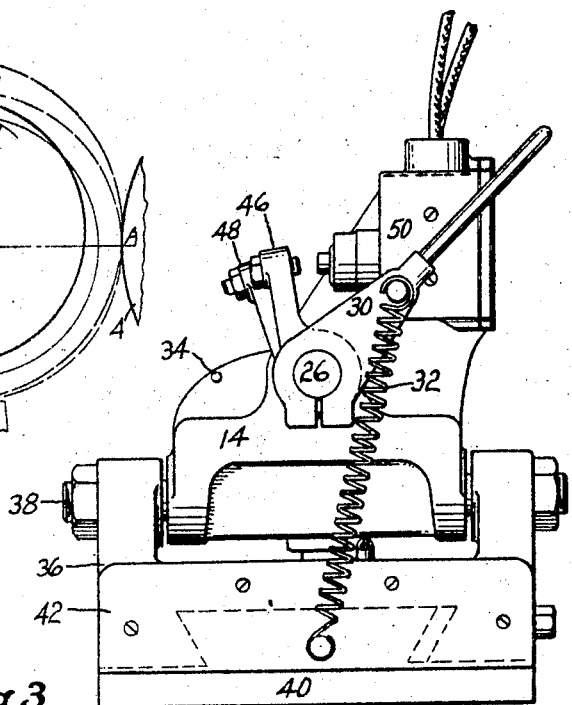
Fig. 3 is a left hand end view of Fig. 1.
Figure 4:
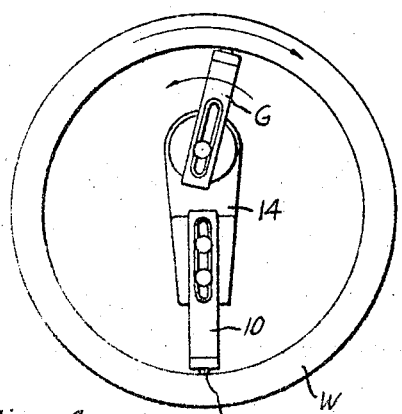
Fig. 4 is a diagrammatic end view.

The other feeler comprises a bent gauging arm G one leg of which is slotted and adjustably secured by a screw 22 in a groove of a collar 24 on a rock shaft 26 which is substantially parallel to the work axis and is journalled by bushings in a boss 28 of the bracket or carrier 14. The other leg of the gauging arm G carries a gauge point or feeler 25 which rides on the bore of the work at one side of a vertical radius and snaps past that radius when the piece reaches the finished internal diameter. The arms 10 and G are so adjusted that the distance from the extended axis of the rock shaft 26 to the feeler point 25 plus the distance from that axis to the feeler F is exactly equal to the desired finished bore diameter of the piece. A master piece is used to aid in this adjustment. An arm 30 having a handle is clamped to the shaft 26 and is normally urged by a coil spring 32 in a direction to press the feeler 25 against the bore of the work. In Figs. 2 and 4, this direction is counterclockwise and in Fig. 3 it is clockwise. The arm 30 can be swung manually past dead center into engagement with a stop pin 34 to hold the feeler 25 retracted prior to shifting the feelers into the work.

The carrier 14 floats with the work, the carrier being pivoted at a considerable distance from the work and between a pair of lugs on a slide 36, the pivot comprising a pair of cone-pointed screws 38 threaded in the lugs. The pivot is preferably close to the level of the work axis. The slide is shiftable along a dovetailed supporting plate 40 as far as permitted by stop plates 42 fixed to the slide and adapted to engage the ends of the plate 40. This shifting is to move the gauge points into or out of the work. Pivotal movement of the bracket or carrier is limited by an abutment 44. In order to control the progress of grinding, the rock shaft 26 carries a pair of switch operating arms 46 and 48 clamped at different angles and carrying adjusting screws to successively engage the plungers of two stitches 50 which are fastened to the bracket 14. The switches may control any usual or desired action of the grinding machine, such as changing the feed from coarse to fine and finally stopping the grinding action when the piece is at finished size. The slide 36 is movable parallel to the axis of the work and to the surface of the backing roller 4.

Fig. 4 indicates the direction in which the gauging arm G swings in order to gradually approach and snap past the vertical radius of the piece when the piece reaches size. Its pivotal axis is not fixed but follows any vertical movement of the lower feeler F which may result from variation in external diameter of successive work pieces in the same run. Consequently pieces which vary somewhat in external diameter can be ground to the same bore size. Adjustment of the arms 10 and G is needed only when pieces of another nominal size are to be ground.

Figure 6:
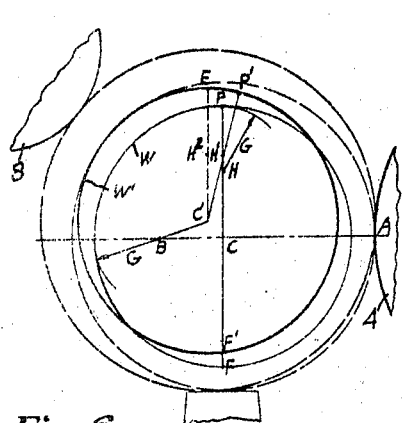
Figs. 6 and 7 are explanatory diagrams.

Fig. 6 indicates the advantage of having the pivot of the gauge arm G shiftable in accordance with variation in the external diameter of the work pieces in a given run. With a work piece W of correct external diameter in contact at point A with the backing roller and resting on a horizontal surface at the bottom and with the finished ground bore centered at C, the upper gauge arm G, pivoted at H above center C and having a constant length G, will start to the right of a vertical radius where it would contact the bore during grinding and snap past the vertical radius at point P at the desired final size. Assuming now there is seated in position an externally larger work piece W' of the same finish ground internal diameter as before, its center C' will be raised a distance equal to the increase in radius and also will be shifted laterally almost an equal amount. The lower feeler F now riding on the bore at F' will raise the gauge as a whole a distance FF' and shift the pivot H an equal amount to H'. The gauge arm G can only snap across a radius of the finished piece because there is not space enough elsewhere in the ring. Since its pivot is at H' and the center of the piece is at C', the only radius available is along the inclined radius C' H' P'.

Theoretically the pivot H' should be shifted laterally as well as vertically to a point H² in the vertical radius through C'. The same gauge arm G could then snap past the point E since both pieces have the same internal diameter with C'E equal to CP. However, due to the selected geometric conditions, it is unnecessary to have this lateral shifting movement of the gauge and yet the same feeler arm of constant length G will be almost equally effective for sizing the bore of the externally larger piece as for sizing the same size bore of the smaller piece. This follows because there is no substantial difference between the distance HP (the constant gauge arm length G) and the distance H'P' for any of the normal differences in external diameter of the work pieces in a given run. For a variation of 1% in external diameter which is several times that which would be expected in practice, the distance H'P' will vary from the constant length G by only about one one-hundredth of 1%. In the foregoing, the work is assumed to have a horizontal support at the bottom but, with the supporting roller 6 at about 140° from the point A as in Fig. 2, the conditions will be more favorable because an increase in external diameter will result in less lateral shifting of the work. Its center will shift upwardly at an angle of 70° instead of 45°.

The value of a shifting gauge center as contrasted with a center which is not displaced by work of different sizes is further made apparent by assuming the center to be fixed at B in a horizontal diameter at a fixed distance from point A. The gauge arm of length G would snap past a horizontal radius on the smaller piece W but the same size bore of the externally larger piece W' would be shifted so far away laterally that the gauge arm would not meet it even in the unground condition and hence the gauge could not be used. In this assumed but unadvantageous arrangement, it is obvious that the bore on the larger piece W' is shifted away from the fixed point B a horizontal distance which is a very large proportion of the increase in external diameter, as compared with the case of the movable pivot H which shifts vertically a distance almost the same as the increase in diameter.

Figure 5:
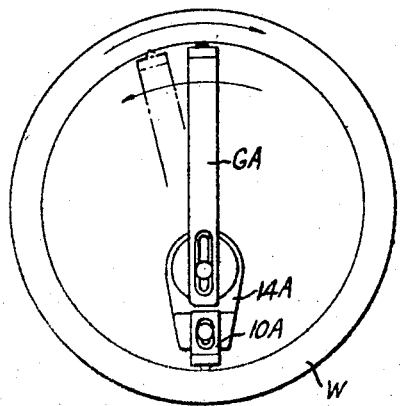
Fig. 5 is a diagrammatic end view indicating a modification.

Fig. 5 indicates a modification in which the upper feeler arm GA is longer than a radius of the piece and has its pivoted axis below center in a carrier or bracket 14A, the lower feeler arm 10A being short. In this case, the upper feeler will start either at the full line position in the vertical diameter or a little to the left of the vertical diameter and gradually swing to a more inclined position as indicated in broken lines. The location of the pivot below center eliminates the snapping action but the region where the gauge point engages the bore is nearly in the direction of displacement of the larger piece. The distance between the feelers is the same as or slightly less than the diameter of the unground bore diameter.

Figure 7:
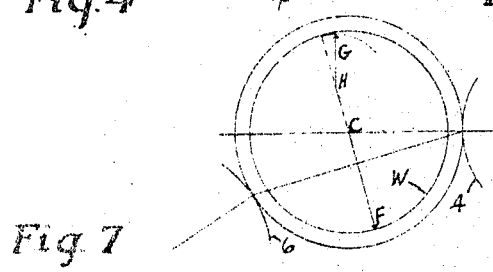

The entire gauge may be inclined, as indicated diagrammatically in Fig. 7, if the lower feeler F will not approach too closely to the grinding wheel when the feeler is supported on the bore half way between the work supports. Increase in external diameter will then cause the feeler F, the center C of the piece and the pivot H to be equally displaced.

I claim:

1. In a device of the character indicated, means for rotatably supporting a circular work piece, a gauge carrier floatingly supported on the work, a work engaging feeler mounted on the floating carrier for movement peripherally of the work, and a spring urging the feeler peripherally of the work.

2. In a device of the character indicated, means for rotatably supporting a circular work piece, a gauge carrier floatingly supported on the work and carrying a pivot substantially in a diameter thereof, an arm mounted to swing on said pivot and having a feeler engaging the work, and a spring for urging the feeler to move crosswise of said diameter.

3. In a device of the character indicated, means for rotatably supporting a circular work piece, a gauge carrier floatingly supported on the work and carrying a pivot located substantially in a line to intersect a diameter of the work and extending substantially parallel to the work axis, a feeler arm mounted to swing on the pivot, and a spring acting on the arm to cause it to yieldingly engage the work and move crosswise of said diameter.

4. In a device of the character indicated, means for rotatably supporting a circular work piece, a gauge carrier floatingly supported on the work, a feeler arm pivoted to the carrier on an axis extending substantially parallel to the work axis and substantially intersecting a diameter of the work, the arm being shorter than a radius of the work, and a spring for urging the arm against the work and circumferentially thereof to snap across said diameter.

5. In a device of the character indicated, means for rotatably supporting a hollow work piece by its exterior surface, a gauge carrier floatingly supported on the inner wall of the work, a feeler arm engaging the wall and having a pivotal axis on the carrier, a feeler on the arm, the pivotal axis being substantially parallel to the work axis and substantially in a diameter thereof, and means for urging the feeler to move along the inner wall crosswise of said diameter.

6. In a machine having means for rotatably supporting a hollow work piece by engagement with a peripheral surface, a floating gauge carrier having a supporting feeler to ride on a peripheral surface of the work, a gauging arm pivoted to the carrier on an axis substantially parallel to the work axis, the gauging arm also having a feeler, the pivotal axis and the supporting feeler being located substantially in line with a diameter of the work, and means for urging the gauging arm to swing about said pivotal axis and crosswise of said diameter to cause its feeler to move peripherally of the surface.

7. In a machine having a pair of rollers for rotatably supporting a hollow work piece, a floating gauge carrier having a supporting arm to ride on the bore of the piece, the supporting arm extending substantially radially of the piece, a gauging arm engaging the bore and pivoted to the carrier on an axis substantially parallel to the work axis, and means for urging the arm to swing about said axis.

8. In a machine having a pair of rollers for rotatably supporting a hollow work piece, a floating gauge carrier having a supporting feeler to ride on the work periphery opposite from the periphery engaged by the rollers, a gauging arm pivoted to the carrier on an axis substantially parallel to the work axis, the pivotal axis and the supporting feeler being located substantially in line with a diameter of the work, and means for urging the arm to swing about said pivotal axis.

9. In a bore grinding machine having means for rotatably supporting a hollow work piece by engagement with the exterior surface, a floating gauge carrier having a supporting arm riding on the bore of the work, a gauging arm movably mounted on the carrier to shift crosswise of the work axis, and means for urging the gauging arm against the bore.

10. In a bore grinding machine having means for rotatably supporting a hollow work piece by engagement with the exterior surface, a floating gauge carrier having a supporting feeler riding on the surface being ground, a rock shaft journalled in the carrier substantially parallel to the work axis, a gauging arm secured to the rock shaft to swing crosswise of the work axis, a spring for urging the gauging arm against the surface being ground, and a switch operating arm carried by the rock shaft.

11. In a bore grinding machine having means for rotatably supporting a hollow work piece by engagement with the exterior surface, a gauge carrier having a supporting feeler riding on the surface being ground, a rock shaft journalled in the carrier substantially parallel to the work axis, a gauging arm secured to the rock shaft to swing crosswise of the work axis, means for urging the gauging arm against the surface being ground, and a slide pivotally connected to the gauge carrier and movable parallel to the work axis.

12. In a bore grinding machine having means for rotatably supporting a hollow work piece by engagement with the exterior surface, a shiftable gauge carrier having a supporting arm and a pivoted gauging arm, each arm having a feeler engaging the surface being ground, the sum of the distances from the feelers to the pivot being equal to the desired diameter of the bore being ground, and means for urging the pivoted arm to snap across a radius of the ground bore.

13. In a bore grinding machine having means for rotatably supporting a hollow work piece by engagement with the exterior surface, a shiftable gauge carrier having a supporting arm and a pivoted gauging arm, each arm having a feeler engaging the surface being ground, the sum of the distances from the feelers to the pivot being substantially equal to the unground diameter of the bore, and the gauging arm being longer than a radius of the piece.

PHILIP H. HUTCHINSON.

REFERENCES CITED

The following references are of record in the file of this patent:

UNITED STATES PATENTS

| Number | Name | Date |
| --- | --- | --- |
| 1,811,480 | Stockwell et al. | June 23, 1931 |
| 1,922,093 | Hutchinson | Aug. 15, 1933 |
| 2,080,941 | Hutchinson | May 18, 1937 |
| 2,152,875 | Cramer | Apr. 4, 1939 |